(12) United States Patent
Kritchman

(10) Patent No.: US 8,609,204 B2
(45) Date of Patent: Dec. 17, 2013

(54) APPARATUS AND METHOD FOR SOLID FREEFORM FABRICATION

(75) Inventor: Eliahu M. Kritchman, Tel Aviv (IL)

(73) Assignee: Stratasys Ltd., Rehovot (IL)

( * ) Notice: Subject to any disclaimer, the term of this patent is extended or adjusted under 35 U.S.C. 154(b) by 276 days.

(21) Appl. No.: 12/478,286

(22) Filed: Jun. 4, 2009

(65) Prior Publication Data

US 2009/0304952 A1 Dec. 10, 2009

Related U.S. Application Data

(60) Provisional application No. 61/059,113, filed on Jun. 5, 2008.

(51) Int. Cl.
| | |
|---|---|
| *C23C 14/28* | (2006.01) |
| *H05B 6/00* | (2006.01) |
| *B05D 1/36* | (2006.01) |
| *B05D 5/00* | (2006.01) |
| *B29C 35/08* | (2006.01) |
| *B29C 35/04* | (2006.01) |

(52) U.S. Cl.
USPC ........... 427/595; 427/258; 427/286; 264/400; 264/401

(58) Field of Classification Search
USPC ............... 156/272.2, 277, 288; 264/400, 401; 427/595, 258, 286
See application file for complete search history.

(56) References Cited

U.S. PATENT DOCUMENTS

| | | | |
|---|---|---|---|
| 5,216,616 A * | 6/1993 | Masters | 264/401 |
| 5,287,435 A * | 2/1994 | Cohen et al. | 345/418 |
| 5,637,169 A * | 6/1997 | Hull et al. | 156/155 |
| 6,259,962 B1 * | 7/2001 | Gothait | 700/119 |
| 6,569,373 B2 | 5/2003 | Napadensky | |
| 6,658,314 B1 | 12/2003 | Gothait | |
| 6,850,334 B1 | 2/2005 | Gothait | |
| 7,052,263 B2 | 5/2006 | John | |
| 7,183,335 B2 | 2/2007 | Napadensky | |
| 7,195,472 B2 | 3/2007 | John | |
| 7,209,797 B2 | 4/2007 | Kritchman et al. | |
| 7,225,045 B2 | 5/2007 | Gothait et al. | |
| 7,300,619 B2 | 11/2007 | Napadensky et al. | |
| 7,500,846 B2 | 3/2009 | Eshed et al. | |
| 2004/0207124 A1 | 10/2004 | Kritchman et al. | |
| 2005/0104241 A1 | 5/2005 | Kritchman et al. | |
| 2006/0127153 A1 | 6/2006 | Menchik et al. | |
| 2006/0249884 A1 * | 11/2006 | Partanen et al. | 264/401 |
| 2007/0179656 A1 | 8/2007 | Eshed et al. | |
| 2009/0020901 A1 | 1/2009 | Schillen et al. | |

* cited by examiner

*Primary Examiner* — Michael Wieczorek
(74) *Attorney, Agent, or Firm* — Pearl Cohen Zedek Latzer Baratz, LLP

(57) ABSTRACT

A Solid Freeform Fabrication system, apparatus and method is provided, that includes a movable fabrication tray adapted to hold an object being fabricated; a depositing surface to hold deposited materials, and ink jet printing heads to selectively deposit a plurality of building materials on the depositing surface; wherein the deposited materials are merged to the object being fabricated, when said fabrication tray moves said object being fabricated to be in contact with said deposited materials.

10 Claims, 12 Drawing Sheets

APPARATUS AND METHOD FOR SOLID FREEFORM FABRICATION

CROSS REFERENCE TO RELATED APPLICATIONS

This application claims benefit of U.S. Provisional Application No. 61/059,113 filed on Jun. 5, 2008, entitled, "APPARATUS AND METHOD FOR 3D PRINTING", which is hereby incorporated by reference.

FIELD OF THE INVENTION

The present invention relates to methods and devices useful in Solid Freeform Fabrication.

BACKGROUND OF THE INVENTION

Solid Freeform Fabrication (SFF) processes are generally processes in which objects are constructed utilizing a computer model of the objects. These processes are used in various fields, such as design-related fields for purposes of visualization, demonstration and mechanical prototyping.

Various techniques of Solid Freeform Fabrication exist, one such technique being three-dimensional (3-D) printing. 3-D printing, as opposed to 2-D printing, generally involves the dispensing of layers of building material, one on top of the other, in order to construct objects. In one such 3-D printing technique, building materials are dispensed in layers from a printing head having a set of nozzles. Depending on the building materials, the layers are then cured using a suitable curing device. The building materials may include modeling materials and support materials, which form the object and the support constructions supporting the object as it is being built.

In cases where objects include overhanging features or shapes, voids, and so on, objects are typically constructed using support constructions, which are used during the printing but are subsequently removed in order to reveal the final shape of the object fabricated. Of course, the use of support materials and formation of support constructions necessitates additional materials, printing time, curing time, cleaning and so on.

Using another method of object printing, objects can be fabricated substantially without support material. Such a method may utilize an apparatus for manufacturing a three-dimensional object by solidifying in layers a liquid material which can be solidified under the influence of light, at locations corresponding to cross-sections of the object. The method requires depositing layers of substantially liquid content, and then selectively curing the layers according to a required layer cross-section, e.g. by curing a cross-section at the surface of a liquid filled vat. Such approach, however, enables using only a single building material for fabricating the object.

It would be advantageous to have an SFF system which enables fabrication of an object comprising a plurality of materials, while at the same time requiring minimal or no support for fabricating 3-D objects for the fabrication process.

SUMMARY OF THE INVENTION

There is provided, in accordance with an embodiment of the present invention, an apparatus for SFF of 3-D objects, comprising a moveable fabrication tray operative to hold an object being printed or fabricated; a depositing substrate (surface) upon which building materials are deposited; and an ink jet printing head to selectively deposit a layer of building materials onto the depositing surface, according to a computer-defined bitmap of the layer; wherein the deposited layer of materials is merged or adhered to the object being fabricated, when the moveable fabrication tray moves said object being fabricated to be placed in direct contact with the deposited layer of materials. A plurality of materials may be deposited in each layer, e.g. two or more materials.

In further embodiments, a method is provided for fabrication of 3-D objects, comprising selectively depositing building material in a layer on a depositing surface, using one or more ink jet printing heads; providing relative movement between a moveable fabrication tray bearing a 3-D object being fabricated, and the layer of selectively deposited material, until the deposited material is merged or adhered to said object being fabricated on said fabrication tray; and moving the fabrication tray bearing the merged object away from the depositing surface, to enable deposition of a new layer on the depositing surface.

In some embodiments, the moveable fabrication tray is above the depositing surface, and the object being fabricated is suspended from the under surface of the fabrication tray. Said moveable fabrication tray is moveable in a vertical direction, towards and away from the depositing surface.

The depositing surface may be stationary or moveable, e.g. a rotating belt. In an embodiment of the invention, the depositing surface comprises a rotating deposition surface or belt. Materials are deposited on the deposition surface and then moved or rotated on the surface to positions where the layer of material may be solidified, e.g. cured, and merged with or adhered to the object being fabricated.

Alternatively, the depositing surface holding the layer of selectively deposited building materials may be above the fabrication tray and the layer of materials is suspended from the depositing surface. One or more inkjet printing heads are operative to selectively deposit a plurality of object building materials on the depositing surface; following which the deposited materials are merged or adhered to the object being fabricated on the fabrication tray, when the layer of material on the depositing surface and the object being fabricated on the fabrication tray are moved relative to one another to be in direct contact.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein.

Figure 1A:
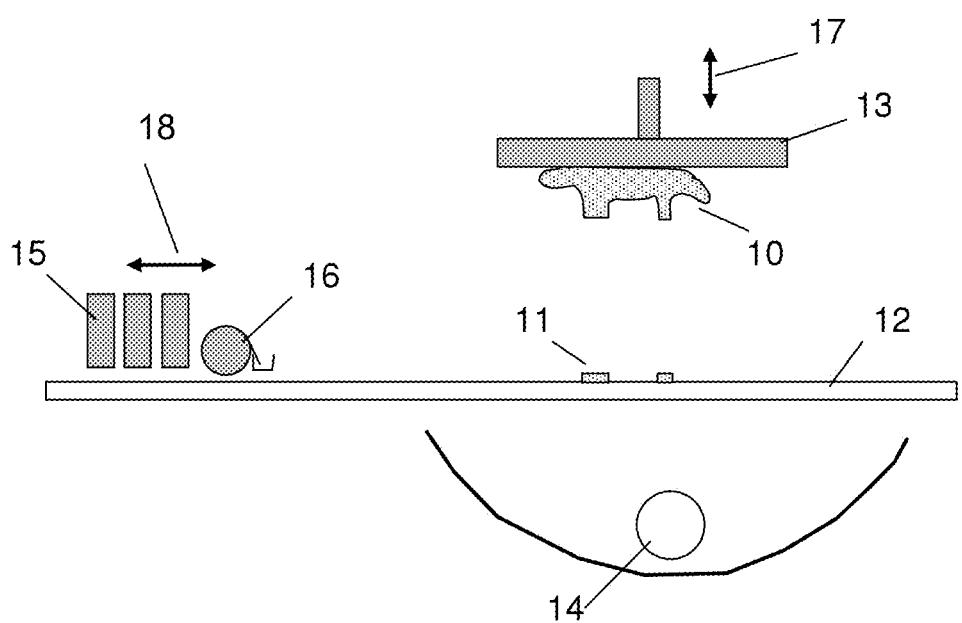
FIG. 1A is a schematic illustration that describes a printing apparatus for fabricating 3-D objects comprising a fabrication tray, a transparent depositing surface to hold selectively deposited building materials and light source, according to some embodiments.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

Solid Freeform Fabrication is a technology enabling fabrication of three-dimensional objects directly from computer data. In an SFF system, a three-dimensional computer model is sliced virtually into thin cross sections, such cross sections being translated into two-dimensional position data, e.g. a bitmap. The data is fed into the control system of the SFF system, which fabricates on the basis of this data, a three-dimensional object in a layer-wise manner. SFF processes are used in various fields, such as design-related fields, for purposes of visualization, demonstration and mechanical prototyping.

The expressions "3-D object" or "3-D model" as used herein may encompass any objects, models, parts, builds, impressions, or other three-dimensional (3-D) printed, fabricated, constructed, built, prototyped or modeled elements. "Object" or "model" as used herein may include a structure that includes the object or model desired to be built. Such structure may, for example, include modeling material alone or modeling material with support material. The terms "support" or "support construction" as used herein may include all structures that are constructed outside the area of the final object itself. The terms "layer" or "slice" as used herein may include two-dimensional portions of an object and/or accompanying support structures optionally laid one above the other in Z direction. The word "layer" in some cases, may also be used to describe a three-dimensional envelope or skin or a region within a layer comprising part of a construction.

The terms "selective" or "selectively" when used to describe the depositing or dispensing of materials, as used herein, may encompass the specific deposition of materials in accordance with the shape of the object being fabricated, for example, according to the layer bitmap of the form being fabricated, and optionally including the deposition of support materials used for temporary strengthening or support of the forms or objects being printed or fabricated.

The term "fabrication tray" as used herein may include any tray, substrate or surface used to hold an object that is being printed, fabricated or modeled, during the course of its fabrication. The terms "depositing surface" or "depositing substrate" as used herein may include any tray, substrate or surface used to hold a layer or layers of building, printing or modeling materials that are deposited by the printing system's printing heads, and that are to be merged with or adhered to an object that is being printed, fabricated or modeled. In some embodiments, the fabrication tray may be above the depositing surface and the object being fabricated is suspended from the tray. Alternately, the depositing surface may be above the fabrication tray and deposited materials may at some stage of the process be suspended from the depositing surface. The fabrication tray is moveable in a vertical direction, so that the object being fabricated may be moved to make contact with the deposition surface and/or the layer deposited thereon and moved away from the deposition surface, usually with the deposited layer merged or adhered to the object being fabricated on the fabrication tray.

In a preferred embodiment, the fabrication tray includes a high-adherence surface or coating (not shown) to which the material layers of the object being fabricated strongly adhere after the material is at least partially cured. The fabrication tray may have a high adhesion surface coating, or comprise other suitable adhesion materials or mechanisms, to securely hold the object being fabricated. For example, the tray may include anodized aluminum, thereby causing a greater surface area and/or a porous surface, bringing about high adhesiveness of the object to the tray. In order to ensure easy release (and thus minimal damage) of a deposited material layer from the depositing surface, the depositing surface in contrast may be covered with a surface coating (not shown), optionally permanent or laid before one or more new layers are deposited, to enable quick release of each new layer deposited once it has merged with the object being fabricated. For example, a permanent release surface like Teflon® or silicon, or a temporary silicon oil release layer may be used.

The term "merging" as used herein refers to the adhering or adjoining of a new layer to previous layers of an object or other construction being fabricated, in such a way as to form an integral part of the object or construction.

It is noted that the term "building material" as used herein may include model or "modeling" material, support material, mixed material, and/or any suitable combination of materials used in the building, forming, modeling, printing, fabrication or other construction of three-dimensional (3-D) objects or models. Building material may include material used to create objects, material used to modify such material (e.g., dyes, fillers, etc), support material, or other material used in the creation of objects, whether or not appearing in the final object. The terms "structure" or "construction" as used herein may include different types and/or combinations of building materials. For example, support constructions may include pillars built from modeling material surrounded by support material. A construction including a single, homogenous material may also be regarded as a structure or construction according to embodiments of the present invention. Building materials or printing materials, as used herein, may include any suitable kind of object building material, such as, for example, photopolymers, wax, powders, plastics, metals, and may include modeling material, support material and/or release material, or any alternative material types or combinations of material types.

According to various embodiments of the present invention, the materials that may be used may be similar to materials described e.g., in U.S. Pat. Nos. 6,569,373, 6,658,314, 6,850,334, 7,183,335, 7,209,797, 7,225,045 and 7,300,619, 7,364,686 and 7,500,846 and PCT Publication No. WO 2009/013751, all of the same assignee, the contents of which are hereby incorporated by reference. Generally, two main types of building materials may be used: a "modeling material" or "model material", being the first building material substantially as described in the aforementioned patents and applications assigned to the same assignee, and "support material", being the second building material substantially as described in the aforementioned patents and applications assigned to the current assignee. Of course, other materials, other numbers of materials and other combinations of materials may be used. For example, photopolymer materials curable by the application of electromagnetic radiation or other forms of radiation, other solidifiable materials or other materials suitable for 3-D object construction may be used. Photopolymer material may be of various types, including, for example, a photopolymer modeling material which may solidify to form a solid layer of material upon curing, and a photopolymer support material which may solidify, wholly or partially, or not solidify upon curing, to provide a viscous material, a soft gel-like or paste-like form, and/or a semi-solid form, for example, that may be easily removed subsequent to printing. The various types of photopolymer material may be dispensed separately or in any given combination, according to the hardness and/or elasticity of the object desired to be formed or any of its parts, or the support constructions required to provide object support during construction. Materials other than those described in the above patents and applications may be used. Wax materials may comprise various types of wax alone or various combinations of wax and other materials suitable for use in fabrication of three dimensional objects, e.g. photopolymer, and may be simultaneously and separately deposited by selective deposition, without or without other materials for modeling and/or support.

The 3-D object being fabricated may consist predominantly of one or more modeling materials and may or may not be combined with support material, in varying ratios and combinations, according to the strength, elasticity or appearance desired for the finished object. Such combinations of materials used for the building of the object, i.e. the model itself, form the "modeling construction".

"Support constructions", on the other hand, may consist predominantly of support material, which may or may not be combined with modeling material in varying ratios and combinations according to the desired strength, elasticity and so on of the support construction. Support constructions may be printed adjacent and/or around part/s or all of the modeling construction/s according to the purpose which the support construction/s are to serve.

A third type of construction that may be printed is the "release" construction, which may consist predominantly of support material (optionally with a relatively small element of modeling material). Release constructions may not solidify or may solidify partially to form a relatively soft material between the object and the support construction, to enable easy release of support constructions from the printed object. For example, the release construction may be a viscous liquid material, paste like material, gel-like material and/or semi-solid material etc., according to the requirements of the object and the purpose which the release construction is to serve in the printing process.

U.S. Pat. Nos. 6,259,962, 6,850,334, 7,500,846 and U.S. Publication No. 20060127153, all assigned to the assignee of the present application and incorporated herein by reference, describe, inter alia, embodiments including an apparatus and method for 3-D object printing. The apparatus may include, for example, one or more printing heads, for example ink-jet type printing heads, having a plurality of nozzles through which building materials are dispensed. The said one or more printing heads may optionally be accompanied by a leveling roller and/or a source of light or heat, within the same unit, i.e. a "printing block" (not shown), which roller and/or source of light or heat move together with the printing heads over the printing surface or tray. A reservoir may be connected to or comprise part of the printing head or block for holding materials to be selectively dispensed in layers onto a printing tray or surface, prior to their deposition. The printing heads (or optionally the reservoir/s) may draw material from one or more containers containing the desired materials. The containers may be connected to the printing heads and/or reservoirs, and supply the materials via a tube or tubes to the printing heads. A common type of container is a cartridge containing building material. Other types of reservoirs, containers, cartridges and feed systems may be used. The apparatus may further include an electromagnetic radiation mechanism or other source of light and/or heat for optionally curing each of the layers of material deposited. The location of depositing, and the amount and/or type of material to be deposited may be controlled by the apparatus' controller as preprogrammed from a 3-D data file. The depth of each deposited layer may be controlled by selectively adjusting the output from each of the plurality of nozzles, or by controlled use of a leveling roller.

As described in U.S. Pat. No. 7,364,686 assigned to the current assignee, and incorporated herein by reference, a relatively solid or semi-solid support structure may be formed using modeling material, for example in the form of narrow vertical pillars or pins joined by horizontal membranes, around, between, and/or within which support material may be dispensed. The support structure, when cured, may provide a semi-solid support construction for the 3-D object being built. Support material may be dispensed alone and may remain uncured for various purposes, for example, to form release constructions between the solidified object and its semi-solid support constructions for easy separation of the two types of construction after printing is complete.

Preferred embodiments of the present invention enable fabricating 3-D objects by selectively depositing a plurality of building materials in a layer via one or more inkjet heads onto a depositing surface or substrate, which may be transparent or opaque, in accordance with the dimensions or shape of the layer being modeled, for example, the bitmap of the layer, which materials are deposited onto the depositing surface, prior to being merged with or adhered to the object being fabricated, i.e. to the previous layers of the object being fabricated. According to some embodiments, 3-D object fabrication may be implemented without the use of support materials, or with minimal usage of support materials.

Reference is now made to FIG. 1A which is a schematic illustration that describes a printing apparatus for fabricating a 3-D object on a fabrication tray, by selective deposition of printing materials on a transparent depositing substrate (surface), according to some embodiments. As can be seen in FIG. 1A, the apparatus includes a fabrication tray 13, from which an object 10 being printed or fabricated is suspended. Tray 13 may be moved up and down, in the direction of vertical arrows 17, to move object 10 being fabricated, to and from new printing material deposits (layers) 11. The newly deposited material layer 11 may be selectively deposited by printing heads 15 onto a transparent depositing surface or substrate 12, according to a layer bitmap. Deposition of the new layer by the printing heads may be conducted by movement of the printing heads (or printing block comprising the printing heads and optionally other elements) over the depositing surface to deposit the new layer in a position immediately beneath the fabrication tray and the object suspended thereunder. The exact position of the deposited material is controlled by the printing system according to the relative position of the previously deposited layers of the object borne on the fabrication tray, as desired for the shape of the object being fabricated.

Transparent depositing surface 12 may enable curing light 14 to access the deposited material through transparent depositing surface 12, optionally from beneath transparent depositing surface 12. As described herein, a plurality of building materials may be used for building the 3-D objects, since the building materials are selectively deposited according to the object being built and more than one building material, e.g. more than one modeling material and optionally a support material, may be deposited in a single layer deposition by the printing heads. For example, each printing head may deposit a different material on the depositing surface, in a single layer deposition to create a layer of an object that may comprise a plurality of material types, colors or textures etc.

Figure 1B:
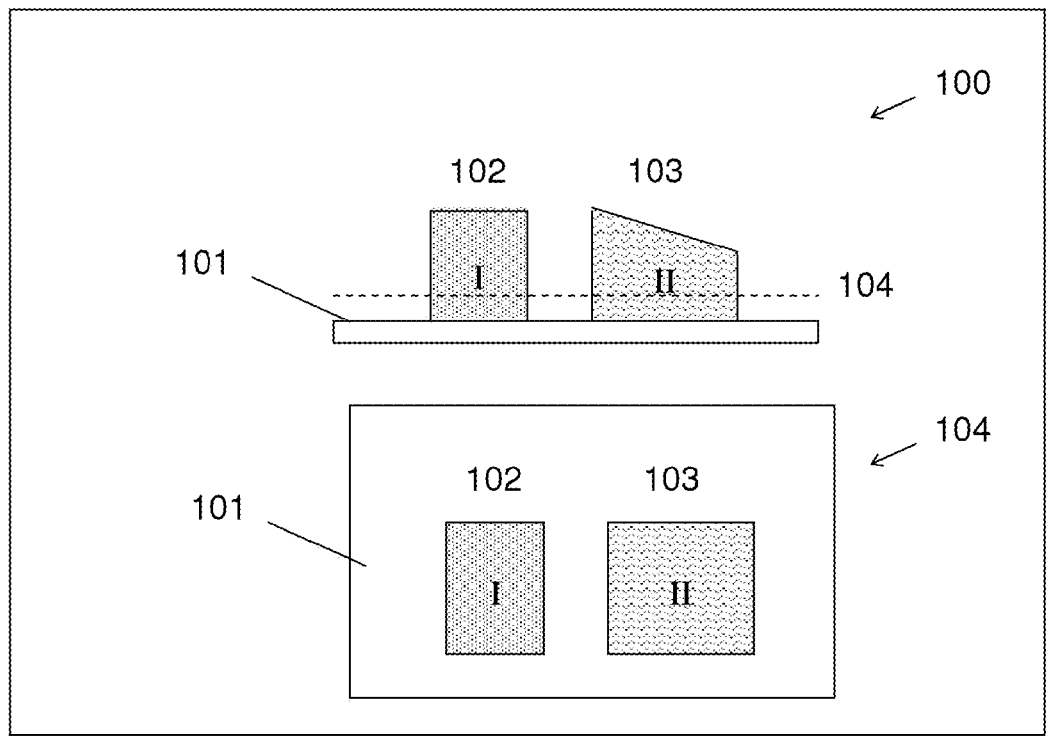
FIG. 1B is a schematic illustration of two object parts on a fabrication tray, each comprising a different material, according to some embodiments.

According to some embodiments of the invention, an object fabrication process may comprise printing a number of different parts simultaneously, each part comprising a different modeling material or different combination of modeling materials, as may be seen in FIG. 1B, where parts deposited in a printing job 100 for fabrication on fabrication tray 101 are comprised of a solid part 102 made of solid material I and an elastic part 103 made of elastic material II. In this case, each part comprises a different modeling material. Cross-section 104 shows a single layer of modeling materials, where both materials are deposited in the same deposition layer, each material (I and II) being selectively deposited in a separate location on the printing surface, to form two different parts 102 and 103.

Figure 1C:
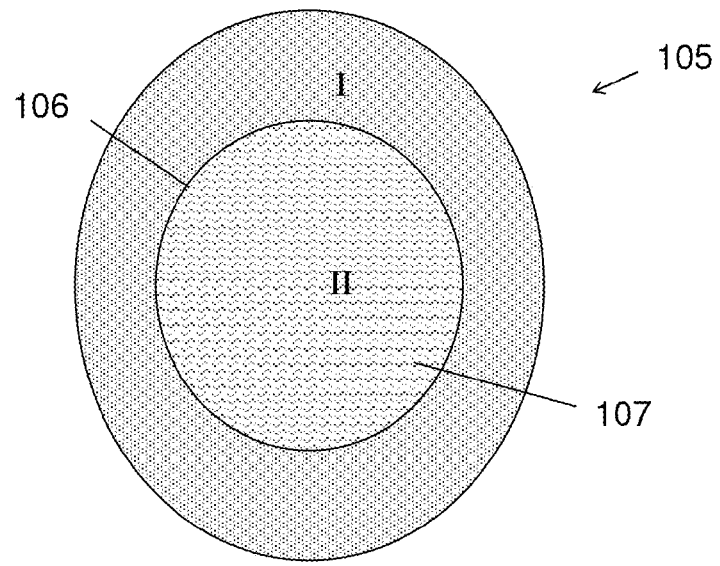
FIG. 1C is a schematic illustration of a cross-section of a part comprising different regions, each comprising different materials.

In another example, in any given layer of the object, a plurality of different modeling materials may be deposited in a single layer deposition, either to construct different parts of an object or to construct different regions of a part, each region within the layer comprising a different modeling material or different combination of modeling materials in order to obtain the desired characteristics, as may be seen in FIG. 1C. FIG. 1C shows a cross-section of a ball-like object 105 having a solid exterior 106 comprising material I, and an elastic center 107 comprising material II. Both materials are deposited simultaneously in a single layer deposition and selectively so as to comprise different regions of the layer, according to the desired characteristics of the final object.

In FIG. 1A, curing light 14 may be constantly turned on. In other embodiments the curing light 14 is turned on only when the object makes contact with the deposited layer (or immediately prior to contact), or at one or more time periods during the depositing and/or merging process. The curing light 14, in some embodiments may be a generic, flood or flash light, or series of flood or flash lights, for example, any light that may be used to bring about curing of the deposited material layers. Other suitable flood lighting to cure the deposited materials may be used. In one example, when a flash light source is used, the flash may be energized before the object or model touches/makes contact with the new layer. Printing heads 15 may include a plurality of heads each having an array of nozzles, and each printing head may be supplied with selected printing or building materials, as controlled by the printing apparatus controller, and according to the object to be fabricated. After depositing and optionally after partial curing deposited materials, a roller 16, accompanying the printing heads in their movement (horizontal direction arrows 18) over the depositing surface, may be used to level the deposited material layers to a selected height. Roller 16 enables a high level of control over the layer thickness, and may further enable multiple deposited layers from multiple printing nozzles to attain uniform thickness.

Printing apparatus as described above and in other systems and methods described hereinbelow enable selective depositing of a plurality of building materials, and general, non-selective curing (partial or full) of the materials. Partial or full curing may be carried out prior to and during the merging of the new layer with the object being fabricated merged with or adhered to the object being fabricated,. Alternatively, the new layer is not cured prior to merging and curing is initiated only when merging of the new layer to the object occurs. Such curing processes enable printing of 3-D objects with or without the use of support materials or constructions, since the new layer is solidified prior to and/or upon merging or adhering to the object and therefore does not require support. Of course, other suitable structures and dimensions may be used. Printing apparatus may be included within and/or coupled to a 3-D printing system. The 3-D printing system may include, for example, a CAD module or other design module, controller, CPU, memory, software, communications unit, material supply units, dispensers, and the printing apparatus.

Figure 1D:
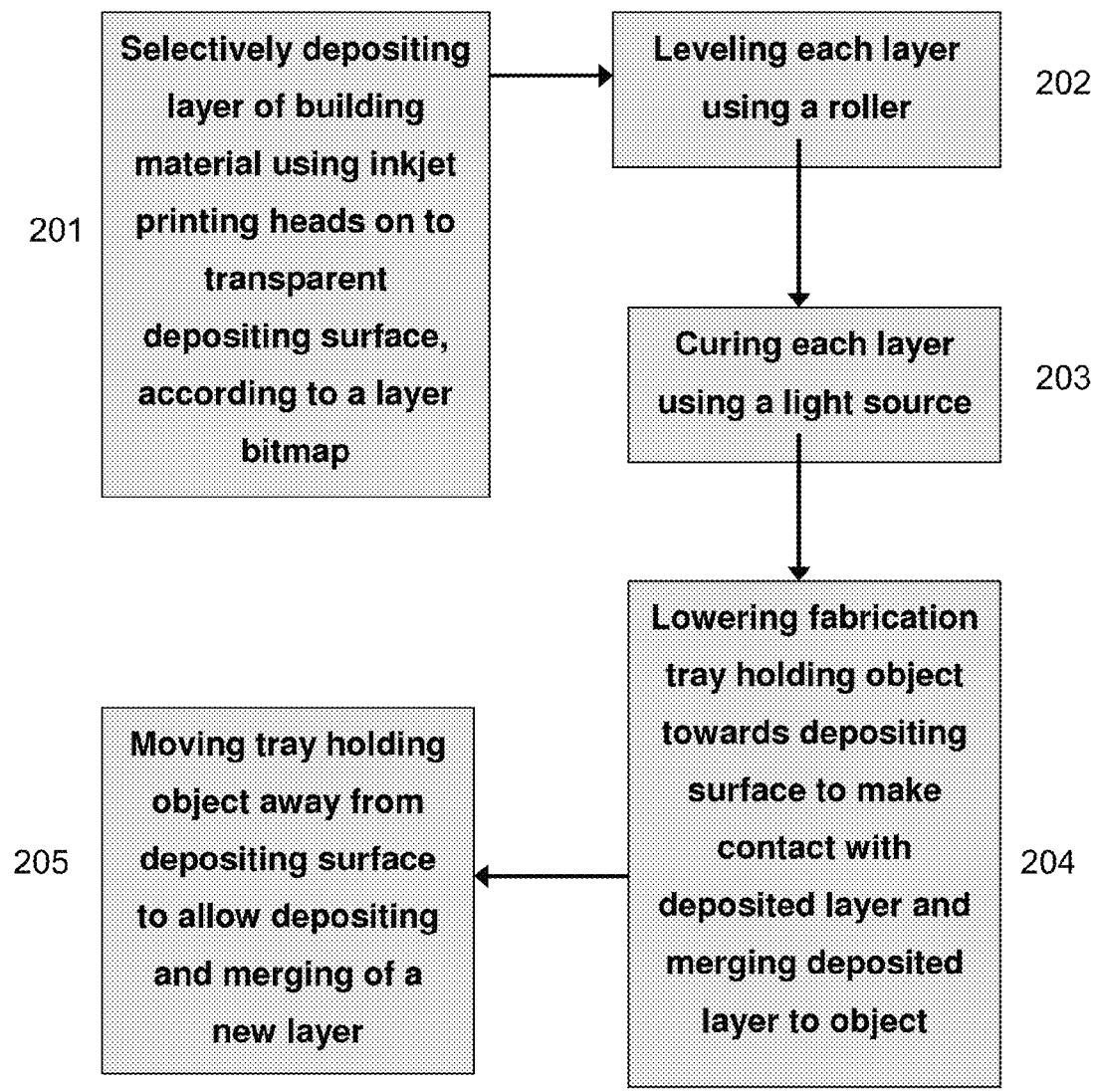
FIG. 1D is a flow chart describing a printing procedure for fabricating a 3-D object on a fabrication tray, using selective deposition of building materials on a transparent depositing surface, wherein a source of light is used, according to some embodiments.

Reference is now made to FIG. 1D, which is a flow chart describing the printing procedure for fabrication using a fabrication tray, using selective deposition of printing materials on a transparent depositing surface, wherein a curing light source is used, according to some embodiments. The 3-D printing apparatus of FIG. 1B may print 3-D objects (stage 201) by selectively depositing one or more kinds of printing material in a layer, using for example inkjet printing heads 15, on a transparent depositing surface, according to a layer bitmap (e.g., providing the layer structure or dimensions required for the object being built). At stage 202, each new layer may be leveled by a roller 16. At stage 103 the deposited layer may be at least partially cured using a flood or flash light source 14. Curing at stage 203 may be minimal, partial or total, in accordance with the object being built, the materials being used, the machine components, the printing environment etc. In some embodiments no curing is done at this stage.

Curing may be implemented using one or more methods, including photo-polymerization, thermal curing, electron-beam curing, curing using flood electro-magnetic radiation, curing by evaporation, multiple component curing, and curing by waiting for suitable time intervals between layer deposits. Radiation may be selected from the group comprising ultraviolet (UV) radiation, Infra Red (I-R) radiation, other sources of electromagnetic radiation, electron beam or natural light. At stage 204 fabrication tray 13 bearing the object being fabricated 10 is lowered towards depositing surface 12 to substantially make contact with the newly deposited material layer 11, in order to merge the deposited layer 11 to the object being printed 10. The extent of contact between the object and the deposited material may be determined according to the object and material parameters. The lowering of the object to the deposited layer may be enabled by providing relative movement between the fabrication tray and the deposited material, until the deposited material is merged to the object being printed on the suspended tray. The merging of the new material layer deposited with the object being printed may be achieved at a variety of adhesion levels and extents of solidification of the object and/or deposited materials. For example, a partially cured deposited layer may be pressed against the object whereby the residual adhesiveness of the layers of materials comprising the object and/or the new layer (after at least partial curing) may be sufficient to cause the merging of the layer to the object. In other embodiments the new layer may be minimally cured, to cause greater adhesiveness. In other embodiments the new layer may be slightly heated to increase stickiness (adhesiveness) prior to merging. In other embodiments the newer layers of the object being printed may remain at least only partially cured and/or or heated to render them sufficiently adhesive so as to receive and merge with the newly deposited layer. At stage 105 the object being printed (including the merged new layer) is lifted away from the depositing substrate, to allow the next new layer to be deposited. Any combination of the above steps may be implemented. Further, other steps or series of steps may be used.

Figure 2A:
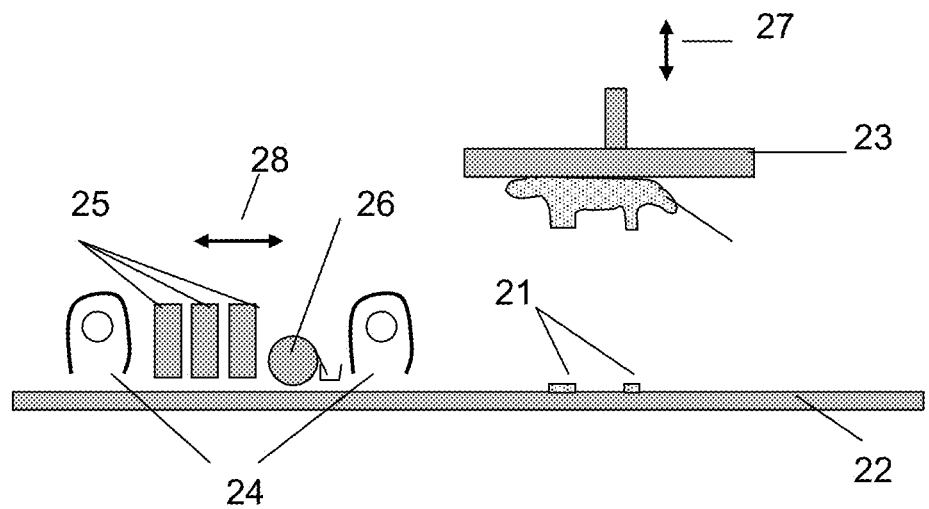
FIG. 2A is a schematic illustration that describes a printing apparatus for fabricating 3-D objects comprising a fabrication tray, an opaque depositing surface to hold selectively deposited building materials, and a source of continuous light, according to some embodiments.

Reference is now made to FIG. 2A which is a schematic illustration that describes a printing apparatus for printing using a fabrication tray 23, using selective deposition of building materials on an opaque depositing surface 22, wherein continuous lighting 24 is used, according to some embodiments. As can be seen in FIG. 2A, the apparatus may include a tray 23, underneath which an object 20 being printed or fabricated is suspended. Tray 23 may be moved up and down, in the direction of the arrows 27, to move object 20 to and from printing material deposits 21. Printing material deposits 21, optionally made up from a plurality of building materials, may be deposited on a depositing substrate 22. Curing light may be provided as continuous light or other suitable flood lighting, from lights 24, to generically cure the deposited materials. Printing material deposits 21 may include one more kinds of building materials for each layer deposited. In this embodiment, curing lights 24 and leveling roller 26 are associated with printing heads 25 and move together with them horizontally over the depositing surface 22 as a unit, to level and at least partially cure the layer 21.

Figure 2B:
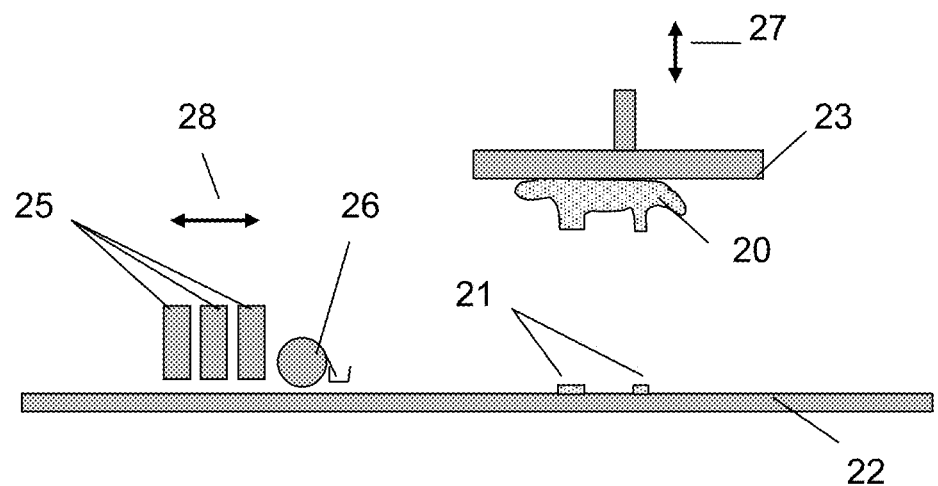
FIG. 2B is a schematic illustration that describes a printing apparatus for fabricating wax objects, comprising a fabrication tray and a depositing surface for holding selectively deposited wax-based building materials, according to some embodiments.

Reference is now made to FIG. 2B which is a schematic illustration that describes a printing apparatus for printing a wax object using a fabrication tray 23, using selective deposition of printing materials on an opaque depositing substrate (surface) 22. In some embodiments the substrate may be heated and/or cooled. As can be seen in FIG. 2B, the apparatus may be used to print or fabricate objects or models 20 as described in FIG. 2A, however the printing heads 25 may supply wax building materials. According to some embodiments, since objects are being printed using wax, there may be no need for a curing light. In further embodiments depositing substrate 22 may include a temperature control element, for example, a heating and/or cooling element (not shown), to provide a variety of solidification and/or curing options, in accordance with the object being built. Accordingly one or more types of wax materials may be selectively deposited to form new layers, and these deposited layers may be subsequently adjoined or merged with the object being built, by lowering the object being fabricated on tray 23 towards the newly deposited layer, or otherwise placing the object in contact with the deposited layer.

In some embodiments the time interval between the depositing and the merging may be selectively configured in accordance with the object being built. For example, if a part of an object being built is resting on a previous layer, such that the new layer is not required to be self-supporting, then there may not be a requirement for the new layer to be fully or even substantially cured or otherwise solidified. In such a case the interval between depositing and merging may be minimal. However, if a part of an object being built is not resting on a previous layer, such that the new layer is required to be partially or fully self-supporting, then there may be a requirement for the new layer to be fully or substantially cured or solidified before the merging. In such a case the interval between depositing and merging may be relatively substantial, to enable greater curing and/or solidification before merging with the object. Of course, the respective extents of solidification of the deposited materials and/or the object being printed (e.g., the external layer(s)) may be selectively configured in accordance with the object being built, the materials being used, the machine components, the printing environment etc. According to some embodiments 3-D object printing may be implemented without the use of support materials, or with minimal usage of support materials.

In some embodiments the apparatus may include a substrate (surface) with a temperature control mechanism (i.e. which may include a cooling element, or heating element, or the substrate may be coupled to a temperature control element), which may be selectively controlled, manipulated or managed to cure or solidify deposited materials. For example, a heatable substrate may be selectively heated in accordance with the contents of the layer of material deposited, to enable whole or partial solidification or curing of deposited materials. In other embodiments the substrate may be selectively cooled in accordance with the contents of the layer of material deposited, to enable whole or partial solidification or curing of deposited materials. In some embodiments different materials may be deposited by different printing heads, and each type of material may be selectively heated or cooled according to its position on the substrate. The heatable or coolable substrate may be used independently or in combination with curing light.

Figure 2C:
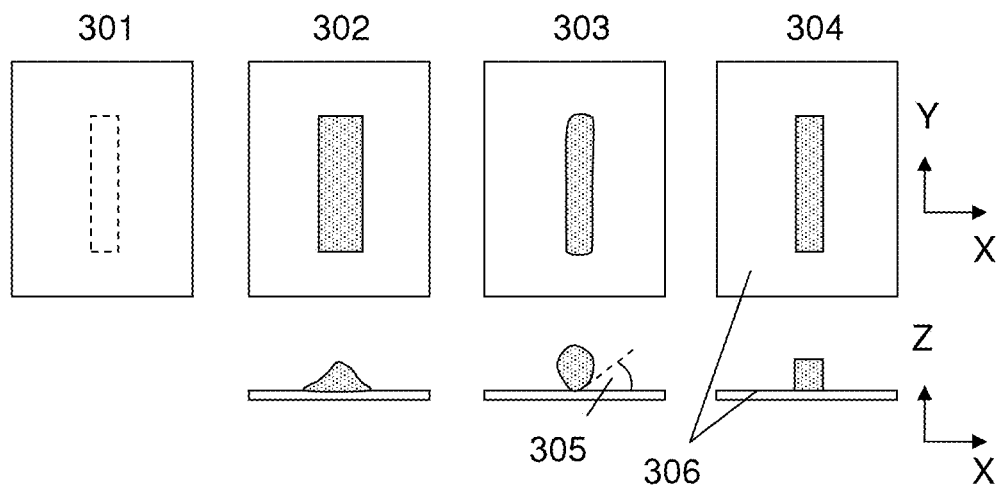
FIG. 2C is a schematic illustration that describes the surface tension characteristics of a depositing surface for selective liquid wax deposition, according to some embodiments.

Reference is now made to FIG. 2C, which is a schematic illustration that describes using selective deposition of wax on a depositing substrate 306, according to a bitmap 301. The surface tension characteristics of a depositing substrate 306 (e.g. foil) must be suited for or adapted to selective liquid wax deposition. If the surface tension of solid-wax interface is too small 302 the wetting angle (Theta 305) of wax will be large and fine details may be smeared or spread out on the substrate. If the surface tension is too large 303, the wetting angle (Theta 305) of wax will be small and fine details may be too loosely held on the substrate. At the same time, wax after solidification should preferably be relatively loosely adhered to the substrate, to enable subsequent damage free removal from the substrate, yet not so loose as to lose the fine details of the printed object, thus an optimal surface tension 304 of the substrate should be configured for use, whereupon a finely detailed object may be printed, which is not damaged by being lifted off the substrate. The printing apparatus may include cooling means to cool the new layer deposited and/or the object being built. The printing apparatus may include releasing means that enable easy releasing of the solidified layer from the substrate. The printing apparatus may include heating means for warming the new layer after being formed, and/or the object being printed for purposes of merging between the two.

Figure 2D:
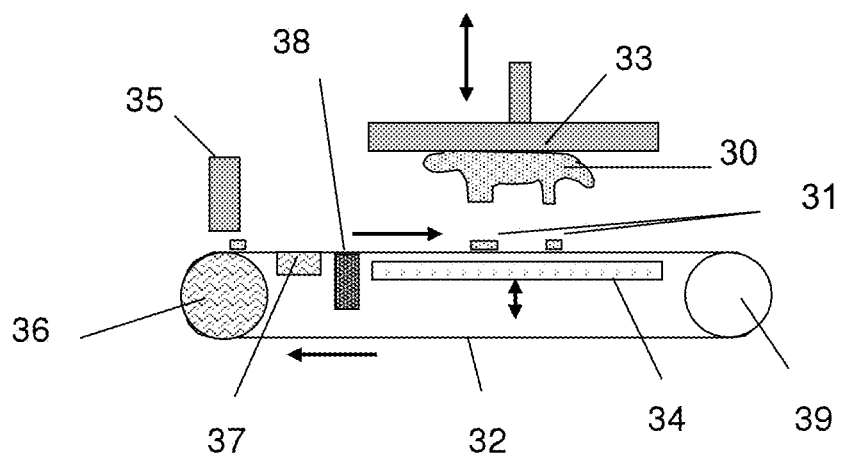
FIG. 2D is a schematic illustration that describes a printing apparatus for fabricating wax objects, using a fabrication tray, and selective deposition of building materials on a rotating depositing surface, according to some embodiments.

Reference is now made to FIG. 2D, which is a schematic diagram describing a printing apparatus adapted to printing wax objects on a rotating, thin, heat-conductive substrate. As can be seen in the figure, the depositing surface is a rotating substrate 32, e.g. a rotating belt, which receives the selectively deposited material, and continues rotating until the new layer is positioned beneath the suspended object 30 being printed on fabrication tray 33. The apparatus includes printing heads 35 for selectively depositing liquid wax materials, a heating roller or 'wheel' 36 and a heating element 37 beneath the rotating substrate to heat the newly deposited liquid wax, a cooling element 34 for subsequently cooling and at least partially solidifying the deposited liquid wax prior to and/or during merging with the object 30, and a thermal insulator 38 between said heating element 37 and said cooling element 34. The tray 33 with the object 30 moves down towards the depositing substrate 32 until the object 30 makes contact with the newly deposited layer 31. Optionally, cooling element 34 positioned beneath (within) the rotating substrate 32 may move upwards until it touches or is substantially close to the substrate where the newly deposited layer 31 is positioned to merge with the object 30. The new layer is thereby cooled and thus solidified and merged to the object 30. The fabrication tray 33 with the object 30 including the merged new layer 31 may then be lifted away from the depositing substrate and thereby detached from it, using the drive and tension roller 39 which draws the depositing surface away. Such an apparatus and method enables the belt to rotate, prior to the depositing of a new layer, optionally providing curing or solidification time for the previously merged layer.

Figure 2E:
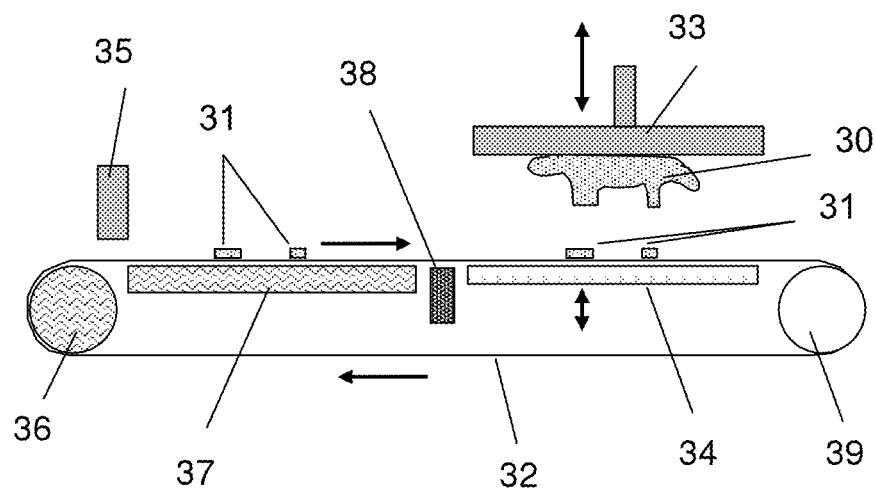
FIG. 2E is a schematic illustration that describes a printing apparatus for fabricating wax objects on a rotating substrate, according to some embodiments.

Reference is now made to FIG. 2E, which is a schematic diagram describing a printing apparatus adapted to printing wax objects on a rotating substrate 32, e.g. belt. According to some configurations, the belt 32 may rotate at different speeds, for example, a slower speed at the point of deposition of materials, to enable the printing heads 35 to accomplish accurate deposition a new layer 31 on the belt, and subsequently a faster speed, in order to move the layer 31 to a controlled position below the fabricated object 30 without cooling in the interim. As can be seen in the figure, the printed layer 31 may be deposited on the depositing surface or belt 32 in the heated area, comprising a heating element 37. The printed layer may therefore remain substantially in liquid form until deposition is complete and the layer 31 is moved towards its position beneath object 30. At this stage the layer 31 may be ready for merging with the object 30, and rotated over a cooling area comprising cooling element 34 positioned beneath rotating belt 32 (and separated from heating element 37 by thermal insulator 38), to allow for partial or total cooling and solidification of the layer. In some embodiments the belt may rotate at a higher or maximum speed so that the new layer moves from the warm position to the cool or transfer position in a minimum time interval, to prevent the deposited layer 31 from exposure and cooling before merging with the object 30. After the object 30 attaches to the new layer 31, the layer 31 may remain in contact with the belt 32 and with the cooling element 34 until the layer is substantially solidified and merged with the cooled object. When the new layer is solidified and merged with object 30, the layer may be detached from the belt and lifted with the object suspended on fabrication tray 33.

Figure 2F:
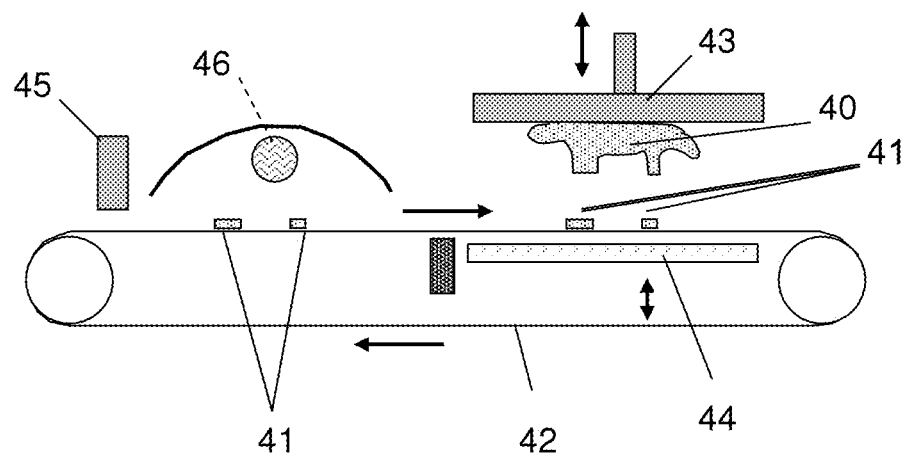
FIG. 2F is a schematic illustration that describes a printing apparatus for fabricating objects, using a rotating substrate and a heat or light source, according to some embodiments.

Reference is now made to FIG. 2F, which is a schematic diagram describing a printing apparatus adapted to printing objects on a rotating substrate, with a warming or curing light source. As can be seen in the figure, printing heads 45 deposit a new layer of material 41 on rotating belt or substrate 42, and the material 41 may be warmed by electromagnetic radiation or other heat source 46 from above, following the deposition of the layer. As a consequence, in the case of wax-based objects, the upper surface of the layer 41 may be warmer than its bottom surface and kept in a substantially liquid state until the new layer 41 is merged with the object 40. In this way, the merging of the deposited layer 41 with the object 40 suspended from fabrication tray 43 may be facilitated. Further, the cooling of the layer and its merging with the object 40, and its subsequent detachment from the substrate 42 may be facilitated using the cooling element 44 situated beneath the belt 42 at the 'merging' position, which cools and solidifies the layer during its merging with the object. According to some embodiments, after merging, the cooler object layers 40 may further extract heat from the newly joined layer 41, until the new layer 41 is solidified and merged with the object. According to some embodiments, cold plate, surface or cooling element 44 may be used to accelerate cooling of the new layer after it has merged with the object.

Figure 2G:
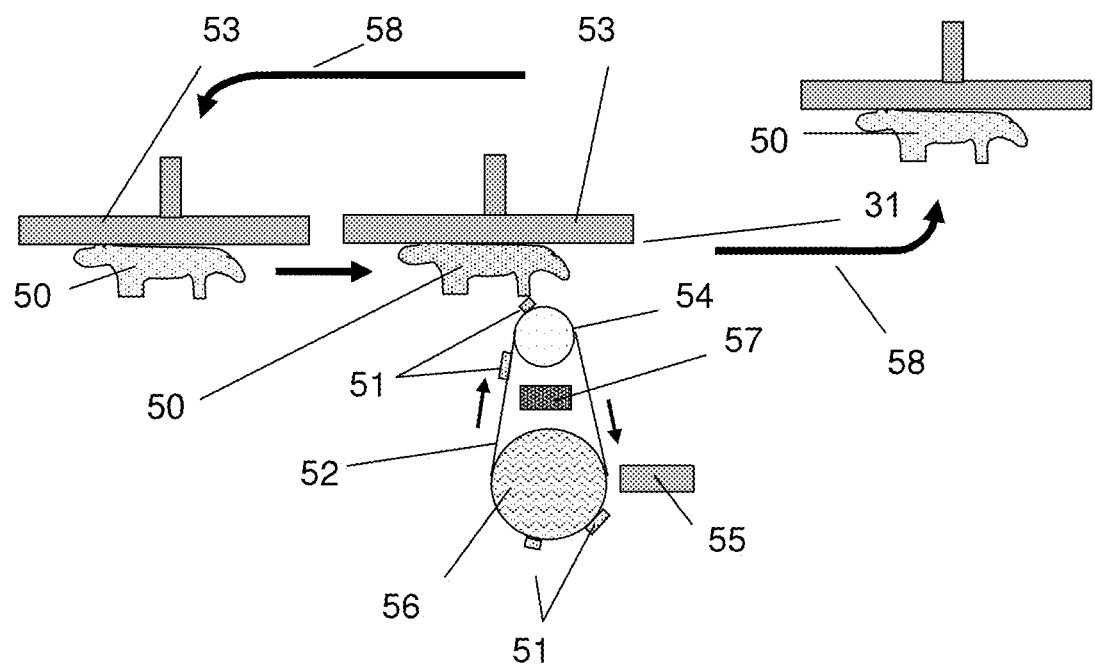
FIG. 2G is a schematic illustration that describes a printing apparatus for fabricating wax objects on a continually rotating substrate, according to some embodiments.

Reference is now made to FIG. 2G, which is a schematic diagram describing a printing apparatus adapted to printing wax objects on a continually rotating heat conductive substrate 52. As can be seen in the figure, the wax jetting head 55 may deposit a new (liquid) layer 51 on a rotating substrate 52 in a warmed zone, warmed or heated by heating roller or 'wheel' 56. The new layer 51 may be rotated towards the transfer point in the cooled zone, cooled by cooling roller (wheel) 54. Heating roller 56 and cooling roller 54 are separated by thermal insulator 57. When the new layer 51 is rotated over cooling roller 54, the bottom surface of the new layer 51 is at least partially cooled and solidified, thereby making the bottom of the layer relatively harder than the top of the deposited layer. In this way, when the new layer 51 is placed in contact with the object 50 being printed and held on fabrication tray 53, the soft upper surface of the material layer 51 may easily merge with the object 50, and the hard bottom surface of the layer 51 may be released from the rotating substrate with relative ease. During the process, fabrication tray 53 moves away from the rotating belt and back into the merging position above the rotating belt, as indicated by arrows 58, in order to coordinate the time interval between deposition of a new layer 51 on the rotating substrate 52 and positioning of the layer 51 in the merging position to be adjoined to the object 50 being fabricated. In addition, with each movement of the fabrication tray 53 away from and back to the merging position, fabrication tray 53 is raised vertically a distance equal to the thickness of a layer 51, to make room for the new layer 51 to be adjoined.

Figure 3A:
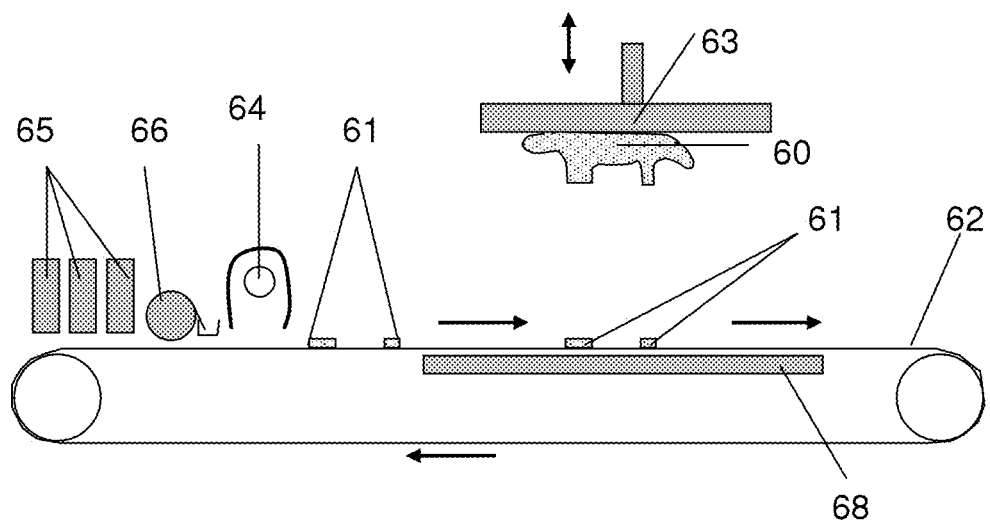
FIG. 3A is a schematic illustration that describes a printing apparatus for fabricating 3-D objects using a fabrication tray, using selective deposition of building materials on a rotating belt, according to some embodiments.

Reference is now made to FIG. 3A, which is a schematic illustration that describes a printing apparatus for printing using a fabrication tray 63, using selective deposition of building materials on a depositing substrate belt 62, according to some embodiments. As can be seen in FIG. 3A, the apparatus may include a fabrication tray 63, for holding an object 60 being printed or fabricated. Tray 63 may be moved vertically, in the direction of the arrows 67, to move suspended object 60 to and from printing material deposits 61. Printing material deposits 61 are deposited on depositing substrate belt 62, by one or more printing heads 65, and may be subsequently partially or fully cured using curing source 64. Curing source 64 and leveling roller 66 are positioned with printing heads 65 and function as a unit. Curing source or light may be provided as continuous light or other suitable flood lighting, from one or more lights 64, to at least partially cure the selectively deposited new material layers 61. The apparatus may further include an impression or backing plate 68 to provide counter-pressure to the fabrication tray 63, when contact is made between the object being fabricated 60 and the newly deposited layer 61, to facilitate merging of the new layer 61 with the previously deposited layers of the object 60. In some embodiments, substrate belt 62 and/or backing plate 68 may be transparent to enable curing light to access the deposited material through the transparent substrate belt 62 and/or backing plate 68, optionally from underneath or within substrate belt 62. When a light source on the sides of the heads is used, as shown in the figure, the depositing substrate 62 does not need to be transparent, therefore substrate or belt 62 may be transparent, opaque or a suitable combination thereof. Belt 62 may rotate in order to move the depositing substrate in accordance with the printing heads 65 and curing sources 64 and positioned beneath fabrication tray 63 bearing object 60 being fabricated. In one embodiment belt 62 may stop rotating in order for the newly deposited layer 61 to merge with the formerly deposited layer part of object 60, and the transfer of the new layer 61 onto the preceding deposited object layer(s) 60. In another embodiment a rapid merging occurs during belt 62 rotation (with accurate synchronization) therefore not requiring rotation to be stopped. In some embodiments belt 62 may be coupled to a positioning unit (not shown), which may include or be coupled to a controller, for specifically determining and controlling the particular positions for depositing and merging materials via belt 62.

Figure 3B:
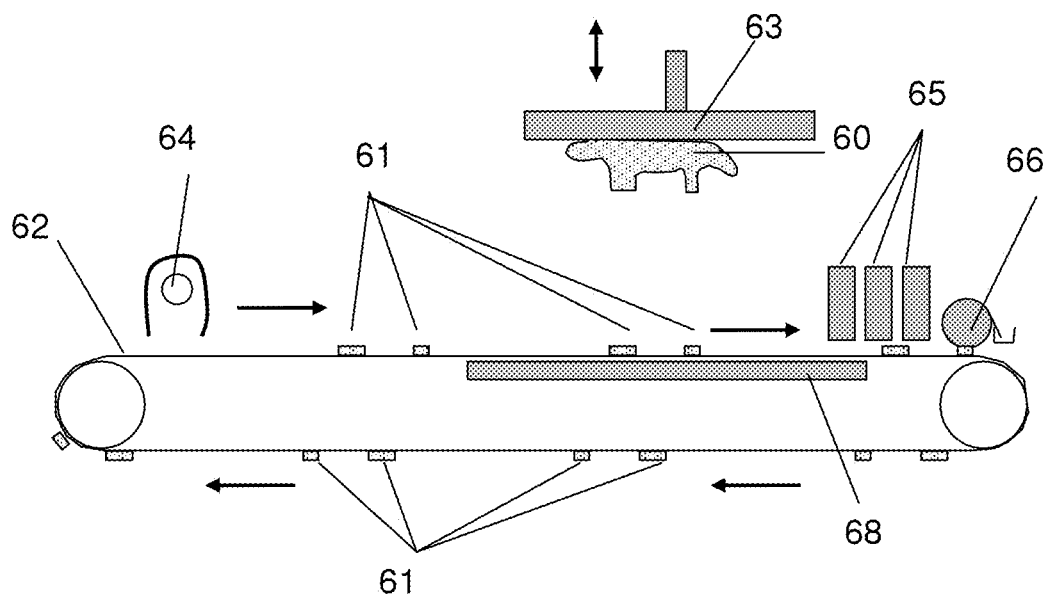
FIG. 3B is a schematic illustration that describes a printing apparatus for fabricating 3-D objects using a fabrication tray, using selective deposition of building materials on a rotating belt, where the light source is relatively distant from the printing heads, according to some embodiments.

According to some embodiments, as can be seen in FIG. 3B, the heating or curing source 64 may be substantially isolated or distant from the printing head(s) 65. For example, when using such a rotation belt 62, the heat generated by the radiation and/or curing source 64 may be located relatively far away from the printing heads 35 and impression point 68, since the moving belt 62 may enable the materials to be deposited on one side of the apparatus, and the curing source 64 to be able to cure the deposited materials on the other side of the apparatus. According to some embodiments, the belt 62 may be transparent, and the heat or curing source 64 may be a continuous light source, such that the light source may penetrate the transparent belt to enable at least partial curing of a selectively deposited layer.

Figure 3C:
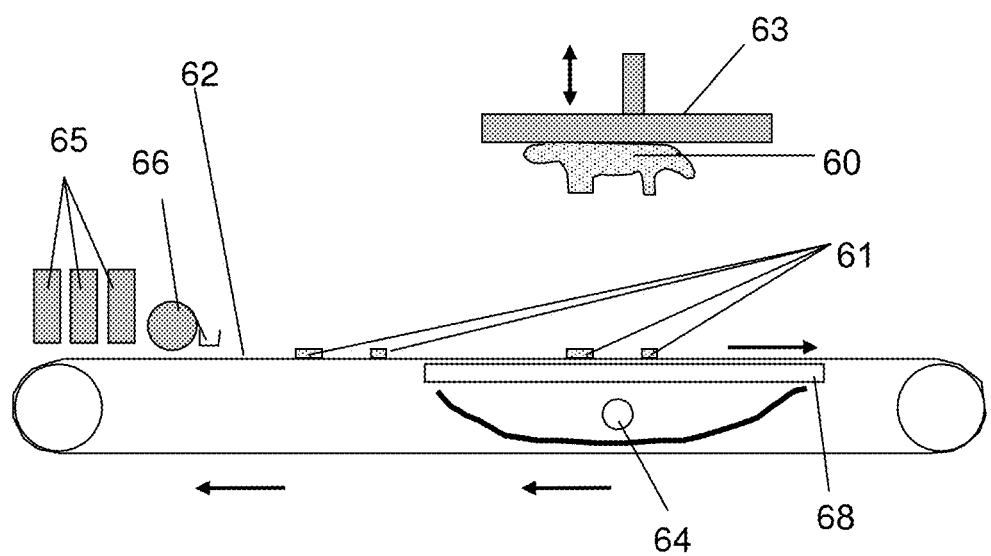
FIG. 3C is a schematic illustration that describes a printing apparatus for fabricating 3-D objects using a fabrication tray, using selective deposition of building materials on a transparent belt, where a flash light is used, according to some embodiments.

Reference is now made to FIG. 3C, which is substantially similar to the apparatus of FIG. 3A, but the curing source or light is a flash light 64 and is situated beneath the depositing substrate belt 62 and beneath impression plate 68, both of which are transparent in this embodiment to enable radiation of the newly deposited layer 61.

Figure 4A:
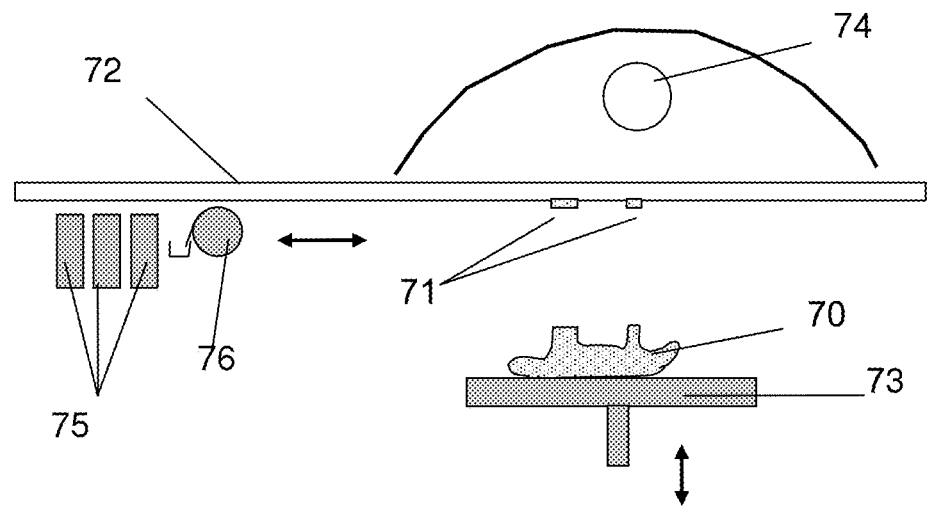
FIG. 4A is a schematic illustration that describes a printing apparatus for fabricating 3-D objects using a fabrication tray, using selective deposition of printing materials on a transparent depositing substrate, wherein a flash light is used, according to some embodiments.

Reference is now made to FIG. 4A, which is a schematic illustration that describes a printing apparatus for printing using a fabrication tray 73, using selective deposition of one or more types of printing materials on the under surface of a transparent depositing substrate 72. In some embodiments a curing lighting source is used, for example a flash light 74. In other embodiments other curing light sources may be used, such as continual light sources, for generically curing selectively deposited materials. As can be seen in FIG. 4A, the apparatus may include a fabrication tray 73, for holding an object 70 being printed or fabricated. Fabrication tray 73 may be moved up and down, in the direction of the arrows 77, to move object 70 to and from newly deposited material layer 71. Newly deposited material layer 71 may be deposited by printing heads 75 on transparent substrate 72, to enable curing light 74 to access the deposited material through transparent depositing substrate 72, optionally from above transparent tray 72. Curing light 74 may be flash light or other suitable flood lighting to generically cure the deposited materials 71. When a flash light source is used, the flash may be energized before the object 70 makes contact with the new layer 71, and/or while the object 70 is in contact with the new layer 71. Printing heads 75 may include a plurality of heads, and each printing head may be equipped with selected modeling and/or support materials. Such a configuration may enable selective printing or depositing of a plurality of building, (e.g. a plurality of modeling and/or support materials), and general non-selective curing, to enable printing of complex objects comprising multiple modeling materials with minimal use of or without support materials or support constructions.

Figure 4B:
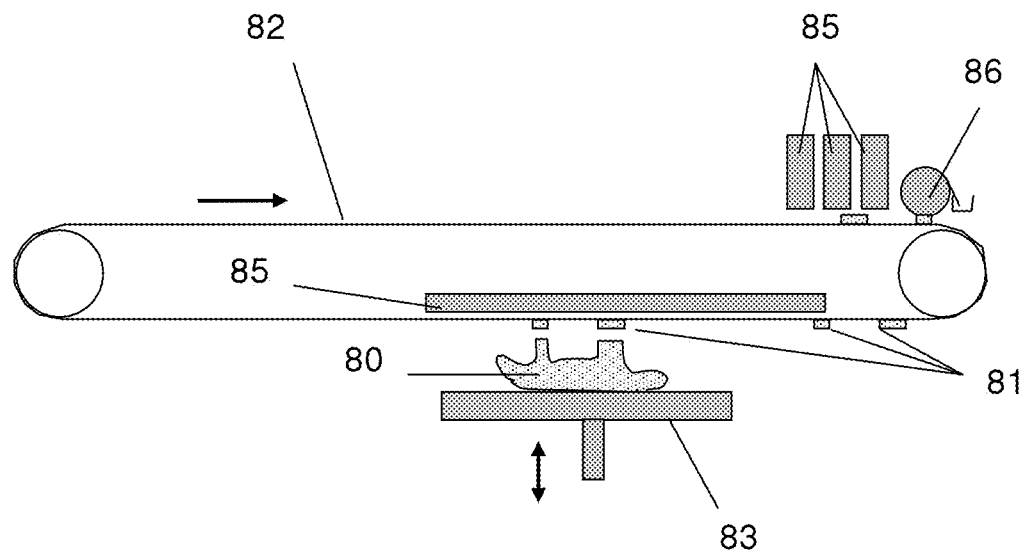
FIG. 4B is a schematic illustration that describes a printing apparatus for fabricating 3-D objects using a fabrication tray, using selective deposition of printing materials on a rotating belt, according to some embodiments.

Reference is now made to FIG. 4B, which is a schematic illustration that describes a printing apparatus for printing using a fabrication tray 83, using selective deposition of one or more types of wax materials on a movable depositing substrate or belt 82, according to some embodiments. As can be seen in FIG. 4B, fabrication tray 83 may be moved up and down, in the direction of the arrows 87, to move object 80 to and from the newly deposited material layers 81. Printing material deposits 81 may be deposited on a depositing substrate or belt 82, and may be given time to at least partially solidify before merging with the object 80 occurs. Cooling element 84 enables cooling and solidification of the new layer prior to and/or during merging with the object. Depositing substrate 82 may be transparent, opaque or a suitable combination thereof. Depositing substrate (belt) 82 may rotate in order to move the depositing substrate 82 in accordance with the relative positions of the printing heads 85 and leveling roller 86, and the fabrication tray 83. In some embodiments, backing plate 84 and depositing substrate or belt 82 may be cooled by a cooling mechanism (not shown) in order to facilitate and complete solidification of the material at the time of merging of the partially solidified layer 81 with the object being printed 80.

Figure 4C:
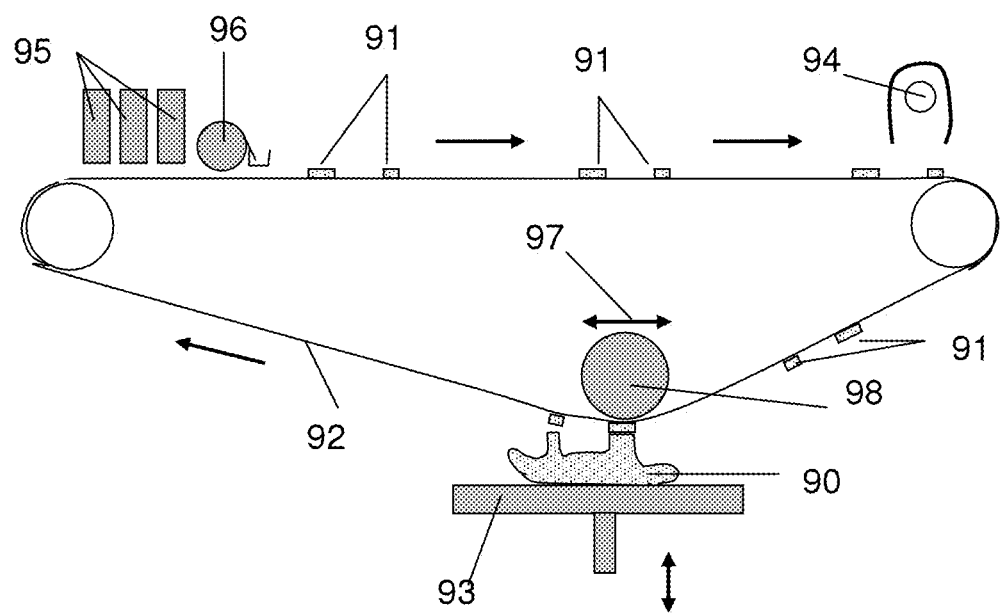
FIG. 4C is a schematic illustration that describes a printing apparatus for fabricating 3-D objects using a fabrication tray, using selective deposition of building materials on a rotating belt and an impression roller, according to some embodiments.

Reference is now made to FIG. 4C, which is a schematic illustration that describes a printing apparatus for printing using a fabrication tray 93, using a pressure roller or rotating pressure roller 98 to facilitate the merging of deposited material layers 91 with the object being fabricated 90, on fabrication tray 93, according to some embodiments. Printing heads 95 deposit one or more types of building materials 91 on belt substrate 92 and the newly deposited material layer 91 is leveled by leveling roller 96. Belt substrate 92 continues to rotate until newly deposited material layer reaches curing source, such as continuous light source 94, where the material is partially or fully cured. In cases where wax is used for building materials no curing source may be required. Belt 92 continues to rotate until deposited materials 91 reach pressure roller 98. Pressure roller 98, is positioned substantially above fabrication tray 93 and moveable along a horizontal rail (not shown in figure), across a range of positions, the length of which is substantially equivalent to the length of the fabrication tray. When belt 92 bearing newly deposited materials 91 reaches pressure roller 98, fabrication tray 93 bearing the object being fabricated 90, moves up so that the object being fabricated 90 makes contact with the newly deposited material layer 91. Pressure roller 98 exerts counter pressure on the deposited materials 91, thereby causing materials 91 to merge with object 90 as an additional layer. As pressure roller 98 moves horizontally along a horizontal rail, different parts of the new material deposits 91 may be merged to the object being fabricated 90. In one embodiment belt 92 may stop rotating before contact is brought about between the new layer 91 and previous layers comprising object 90, and the transfer of the new layer 91 onto the layers of object 90. In another embodiment rapid instant merging occurs during belt rotation (with accurate synchronization), therefore not requiring rotation to be stopped. In some embodiments fabrication tray 93 can move up or down in the direction of arrows 97 to allow the impression of each new layer to occur at substantially the same height and/or place. In some embodiments impression roller 98 may be maneuvered horizontally along a range of positions along the rail, to position roller 98 in order to impress the materials 91 in the correct location(s) on the object being fabricated 90. In this way the height/distance of the pressure roller 98 relative to the object being fabricated 90 remains at a constant distance at the time of contact between the new 91 and the previously deposited layers 90. In this way the distance remains substantially equivalent to the thickness of a layer.

Figure 4D:
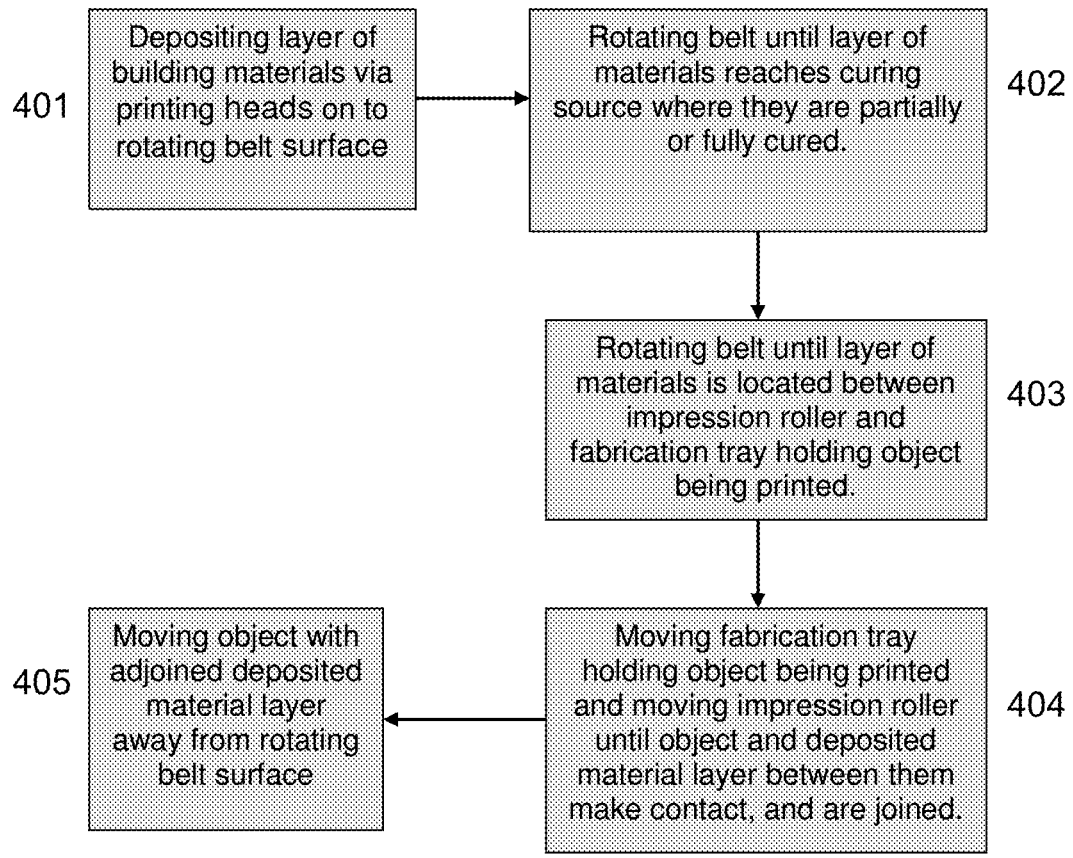
FIG. 4D is a flowchart illustrating a method of implementing 3-D printing using an impression roller, according to some embodiments.

Reference is now made to FIG. 4D, a flowchart illustrating a series of operations or processes to implement 3-D printing without support materials, according to some embodiments. As can be seen in FIG. 4D, at step 401 one or more printing materials 91 are deposited on a substrate belt 92 using printing heads 95. At step 402, belt 92 is rotated until deposited materials reach curing source 94, where they may be partially or fully cured. At step 403 the rotating belt 92 is further rotated until deposited materials 91 reach pressure roller 98, which is operative to exert counter pressure on deposited materials 91. At step 404 fabrication tray 93 bearing object being fabricated 90 moves until the object 90 is in contact with the deposited materials 91 and pressure roller exerts counter pressure on the deposited materials 91 thereby causing materials 91 to be joined to object 90 as an additional layer. At step 405, the object being printed, including newly joined or merged layer 91, is moved away from the depositing substrate 92, to allow the next layer to be deposited and merged. Any combination of the above steps may be implemented. Further, other steps or series of steps may be used.

The foregoing description of the embodiments of the invention has been presented for the purposes of illustration and description and is not intended to be exhaustive or to limit the invention to the precise forms disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method of fabricating 3-D objects, comprising:
   selectively depositing two or more different building materials, in layers, on a depositing surface, using two or more inkjet printing heads, each of said layers corresponding to a cross section of a three-dimensional object to be fabricated, wherein at least one of the layers includes at least two of said two or more different building materials; and
   transferring, layer by layer, a deposited layer from the depositing surface to a fabrication tray prior to depositing a subsequent layer by providing relative movement between the object being fabricated on the fabrication tray and said deposited layer, until said deposited layer and a previously transferred layer make contact and are merged,
   wherein a time interval between depositing the deposited layer and merging the deposited layer with the previously transferred layer is selectively configured in accordance with the three-dimensional object being fabricated and desired degree of solidification of the deposited layer such that the time interval is larger if the deposited layer is required to be self-supporting and smaller if the deposited layer is not required to be self-supporting.

2. The method of claim 1, wherein said object is suspended from the fabrication tray.

3. The method of claim 1, comprising at least partially curing said deposited layer prior to transferring.

4. The method of claim 1, comprising at least partially curing said deposited layer using a curing mechanism selected from the group comprising UV radiation, I-R radiation, other sources of electromagnetic radiation, electron beam, natural light, heating and cooling.

5. The method of claim 1, wherein the depositing surface is a rotating belt and further comprising exerting counter pressure against the depositing surface, using a backing plate or impression roller.

6. The method of claim 1, wherein at least one of said two or more building materials is photopolymer or wax.

7. The method of claim 1, including cooling said deposited layer.

8. The method of claim 1, including heating said deposited layer.

9. The method of claim 1, comprises applying a release layer on the deposition surface to enable easy release of said deposited materials.

10. The method of claim 1, wherein said depositing surface is a rotating belt.

* * * * *